H. QUERTIER.
MEANS FOR ELECTRICALLY TRANSMITTING ORDERS OR SIGNALS AND FOR INDICATING THEIR NATURE AND THE POINTS OF TRANSMISSION.
APPLICATION FILED SEPT. 2, 1910.
1,080,167.
Patented Dec. 2, 1913.
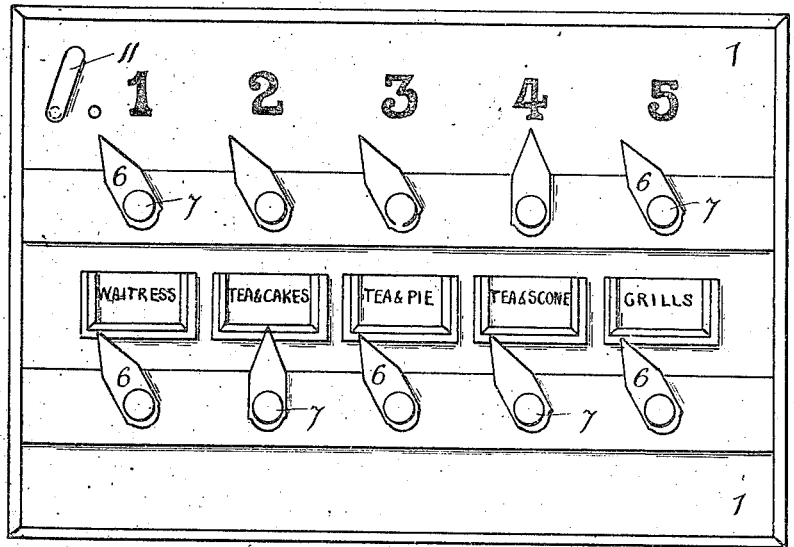
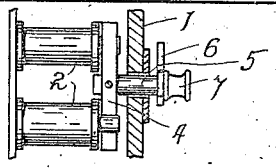
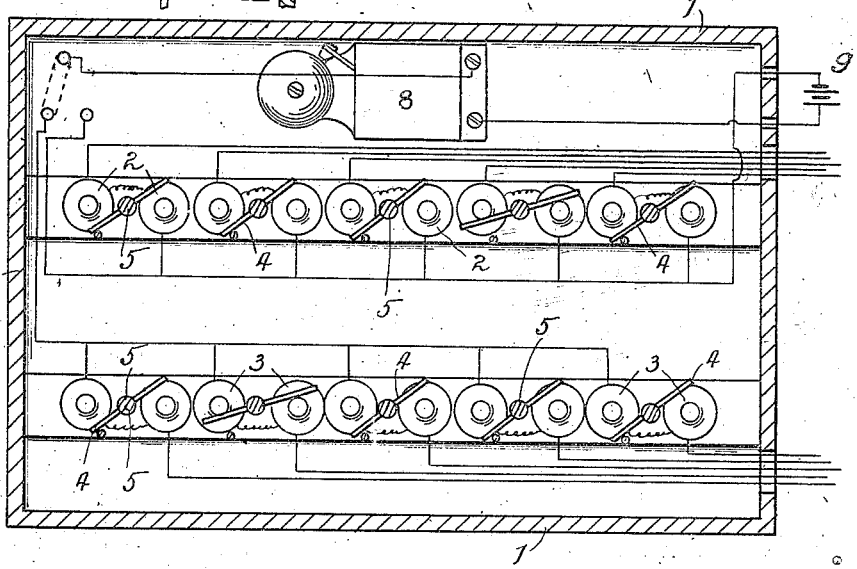
WITNESSES:
INVENTOR,
HILARY QUERTIER,
by
Attorney.

H. QUERTIER.
MEANS FOR ELECTRICALLY TRANSMITTING ORDERS OR SIGNALS AND FOR INDICATING THEIR NATURE AND THE POINTS OF TRANSMISSION.
APPLICATION FILED SEPT. 2, 1910.
1,080,167.
Patented Dec. 2, 1913.
2 SHEETS—SHEET 2.
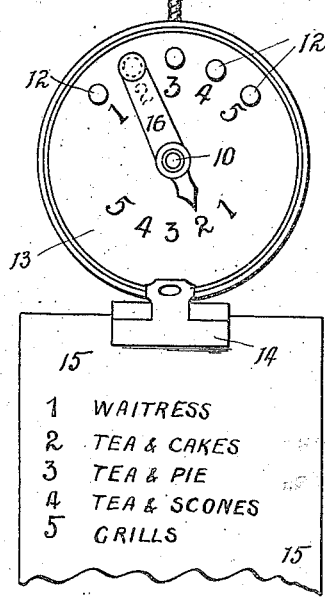
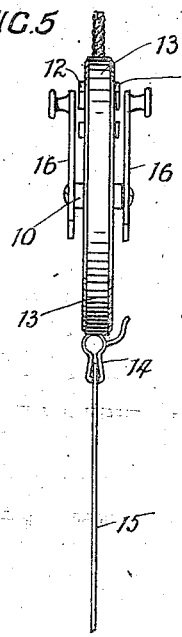
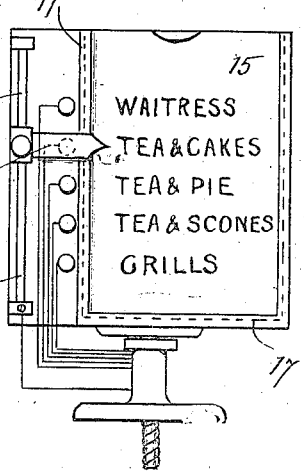
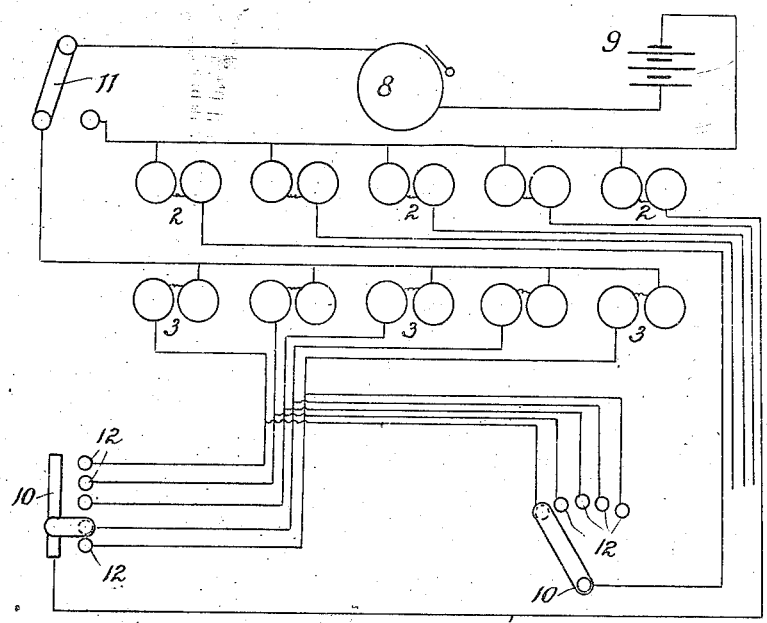
WITNESSES:
INVENTOR,
HILARY QUERTIER,
by
Attorney.

UNITED STATES PATENT OFFICE.

HILARY QUERTIER, OF WELLINGTON, NEW ZEALAND.

MEANS FOR ELECTRICALLY TRANSMITTING ORDERS OR SIGNALS AND FOR INDICATING THEIR NATURE AND THE POINTS OF TRANSMISSION.

1,080,167.

Specification of Letters Patent.

Patented Dec. 2, 1913.

Application filed September 2, 1910. Serial No. 580,231.

*To all whom it may concern:*

Be it known that I, HILARY QUERTIER, a subject of the King of Great Britain, residing at Wellington, in the Dominion of New Zealand, have invented a new and useful Means for Electrically Transmitting Orders or Signals and for Indicating Their Nature and the Points of Transmission; and I do hereby declare the following to be a full, clear, and exact description of the same.

This invention relates to apparatus that has been designed for the purpose of electrically transmitting any one of a number of orders from a single transmission point or from each of a number of separate transmitting points and for indicating at a central point the order transmitted and the point from which it has been transmitted by the one operation of the operator.

The invention also relates to an indicator apparatus by means of which the number of messages or orders in the system may be recorded.

The invention is particularly adaptable for electrically transmitting orders in dining rooms, restaurants, cafés or other places, from the different tables therein, to the kitchen or servery or other central point. The means devised may however be adopted for other purposes, such for instance as for sending an alarm of fire from a building or or street to a central station and for indicating the particular point of such building or street from which the alarm is transmitted together with the name of the street or building.

In describing the invention it will be described mainly as adapted for use in a restaurant for the purpose of transmitting and indicating any one of five different orders from each of five tables. The principles governing the construction of the apparatus and the system of wiring and battery connections, may however be extended to allow for any number of orders and any number of transmission points, and may also be varied to suit different purposes without departing from the spirit of the invention.

In order that the invention may be understood, reference will be made to the accompanying sheet of drawings, in which:—

Figure 1 is a front elevation of the indicator. Fig. 2 is a front elevation thereof with the front removed. Fig. 3 is a detail of the means employed for actuating one of the indicator pointers. Fig. 4 is a front elevation, and Fig. 5 a side elevation of a suitable form of transmitting selector switch for use with the apparatus. Fig. 6 is an alternative form thereof. Fig. 7 is a diagram illustrating the electric connections embodied in the working of the apparatus.

In the apparatus shown electro-magnets having swinging armatures to operate the indicators are employed, but other apparatus of like principle may be used to obtain the same result, for instance, swinging coils mounted between permanent magnets may be substituted. Consequently where the terms electro-magnets and swinging armatures are used herein, they are to be taken as including their electric equivalents arranged to cause the indicator pointers to be turned on pivots upon the closing of electric circuits in which they are arranged.

In carrying out the invention a casing 1 is arranged to be supported in a suitable position and within the casing are arranged two sets of five each of electro-magnets, one set 2 being arranged to respectively correspond with five different transmission points, while the other set 3 is arranged to respectively correspond with five distinct orders to be transmitted from each of the five different transmission points. A swinging armature 4 is mounted upon a spindle 5 arranged between the poles of the two coils of each electro-magnet. This spindle is journaled in the front of the casing 1 and extends out beyond such front as shown in Fig. 3. An indicator pointer 6 is secured to the front end of the spindle and the armature 4 is so disposed that when the magnet is quiet, the pointer 6 may be turned to a position inclined from the vertical by means of the finger piece 7 on its front face. When the magnet is energized, the armature will be attracted to its poles, causing the spindle to rock and the pointer to assume a vertical position.

In Figs. 1 and 2 the five pointers of the set of magnets 2 are arranged respectively beneath numerals fixed to the front of the casing, while the pointers of the other set 3 are arranged respectively beneath the names of articles upon a menu.

An electric bell or other sonorous signal 8 is placed within or upon the casing 1.

At each transmission point, say for instance a table, a selector switch constructi of either of the forms shown in Figs. 4 or 6, or of other suitable form, is placed. These respective switches each have a single contact piece electrically connected with the corresponding electro-magnets of the set 2, and each have five contact pieces connected respectively with the several electro-magnets of the set 3. The switch is adapted to connect the single contact piece with any one of the five contact pieces, at will.

In the system of wiring shown in Fig. 7 the wiring for the first and fifth of the transmission points is shown complete, the wiring for the other points being a mere duplication. In this figure, the current passes from the battery 9 to each of the electro-magnets of the first set and then from each of such magnets to the single contact piece 10 of each selector switch. From the other pole of the battery a wire leads through the bell 8 to a two way switch 11 and then to each of the electro-magnets of the second set 3. From each of such magnets a wire leads to the respective contact piece of the five contacts 12 of each selector switch. Thus upon the switch being operated to bridge the contact 10 with any one of the contacts 12 the circuit will be completed and the corresponding electro-magnets of the two sets energized and their pointers 6 turned up to indicate the point of transmission and the particular order transmitted. At the same time the bell 8 will be caused to sound.

The two way switch 11 is provided to allow of the electro-magnets being cut out of the battery circuit and for the bell 8 being short circuited so that it may ring continuously if so desired, the wire leading from the battery to the electro-magnets 2 being also carried on to the second stud of such switch.

In the construction of selector switch shown in Figs. 4 and 5 an insulating block 13 is suspended over a table and is provided with a clip 14 for attaching a menu card 15 thereto.

The contact 10 is trunnioned in the center of the block and to it is attached the spring switch lever 16. Arranged concentrically around the block are the several contact studs 12 so disposed that the lever 16 in its movement will pass across them and may be pressed into contact with either one. The several studs are numbered in accordance with the numbers opposite the names on the menu card and with the respective indicator pointers 6. The switch lever 16 may be duplicated on the reverse side of the block as shown in Fig. 5, the contact studs being carried right across the block.

In the form shown in Fig. 6 the menu card 15 is mounted in a semi-rotating stand 17 up one side of which a metallic bar 18 extends, such bar corresponding with the contact 10. The studs 12 are arranged on the frame 17 opposite each name on the menu and a sliding spring switch lever 16 is mounted on the bar 18 and adapted to be moved up or down thereon so as to be pressed into and made to contact with any of the studs 12 desired and corresponding to the order to be transmitted. This switch may also be duplicated on the reverse side of the frame.

What I do claim as my invention and desire to secure by Letters Patent is:—

In means for the purpose herein described, the combination of a source of current; a group of electrical transmission-point indicators each connected to one pole of said source; a group of electrical message-indicators each connected to the other pole of said source; a plurality of message switches, one at each transmission point and each comprising a common contact, a plurality of message contacts and means for connecting the common contact with any one of the message contacts; means for connecting each common contact with the corresponding transmission point indicator; and means for connecting each corresponding message contact to the corresponding message indicator.

In testimony whereof, I have signed this specification in the presence of two subscribing witnesses.

HILARY QUERTIER.

Witnesses:
W. ALEXANDER,
M. E. BROWN.